United States Patent
Fabian et al.

(10) Patent No.: US 7,010,205 B2
(45) Date of Patent: Mar. 7, 2006

(54) COATED OPTICAL FIBER AND OPTICAL FIBER COATING SYSTEM INCLUDING A HYDROPHILIC PRIMARY COATING

(75) Inventors: Michelle D. Fabian, Horseheads, NY (US); Kevin R. McCarthy, Horseheads, NY (US); Michael J. Winningham, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/675,720

(22) Filed: Sep. 29, 2003

(65) Prior Publication Data

US 2005/0069272 A1 Mar. 31, 2005

(51) Int. Cl.
*G02B 6/02* (2006.01)
*G02B 6/16* (2006.01)
*G02B 6/22* (2006.01)

(52) U.S. Cl. ..................... 385/128; 385/123
(58) Field of Classification Search ............... 385/128, 385/123; 522/171, 92
See application file for complete search history.

(56) References Cited

U.S. PATENT DOCUMENTS

| | | | |
|---|---|---|---|
| 4,682,851 A | | 7/1987 | Ansel |
| 5,278,217 A | | 1/1994 | Umeda et al. .............. 524/394 |
| 5,326,531 A | * | 7/1994 | Hahn et al. .............. 422/82.06 |
| 5,902,631 A | | 5/1999 | Wang et al. |
| 6,087,000 A | * | 7/2000 | Girgis et al. ............... 428/392 |
| 6,176,849 B1 | | 1/2001 | Yang et al. |
| 6,289,158 B1 | | 9/2001 | Blyler et al. |
| 6,304,704 B1 | * | 10/2001 | Kalish et al. .............. 385/128 |
| 6,563,996 B1 | | 5/2003 | Winningham ............. 385/128 |
| 6,579,914 B1 | * | 6/2003 | Gantt et al. ................. 522/92 |
| 2001/0002410 A1 | * | 5/2001 | Szum ........................ 522/171 |
| 2001/0003796 A1 | | 6/2001 | Yang et al. |
| 2001/0027299 A1 | | 10/2001 | Yang et al. |
| 2002/0016574 A1 | | 2/2002 | Wang et al. |
| 2003/0077059 A1 | | 4/2003 | Chien et al. ................ 385/128 |

FOREIGN PATENT DOCUMENTS

| | | |
|---|---|---|
| EP | 0457292 A2 | 11/1991 |
| EP | 0477501 A2 | 4/1992 |
| EP | 0 566 801 A2 | 10/1993 |
| JP | 2002236238 | 8/2002 |
| WO | WO94/09048 | 4/1994 |
| WO | WO95/20151 | 7/1995 |
| WO | WO03/011938 | 2/2002 |

(Continued)

OTHER PUBLICATIONS

Zhujun et al., "Poly(vinyl alcohol) as a Substrate for Indicator Immobilization for Fiber-Optic Chemical Sensors", Anal. Chem. 1989, 61, pp. 202-205.

(Continued)

*Primary Examiner*—Frank G. Font
*Assistant Examiner*—Mary El-Shammaa
(74) *Attorney, Agent, or Firm*—Robert L. Carlson; James V. Suggs

(57) ABSTRACT

The present invention provides optical fiber coating systems and coated optical fibers having hydrophilic primary coatings. According to one embodiment of the invention, a coated optical fiber includes an optical fiber having a core and a cladding; a hydrophilic primary coating encapsulating the optical fiber, the primary coating having a Young's modulus less than about 2 MPa; and a secondary coating encapsulating the primary coating, wherein the primary coating exhibits substantially no water bubble formation and substantially no delamination when the coated optical fiber is soaked in water at 23° C. for 30 days.

23 Claims, 1 Drawing Sheet

FOREIGN PATENT DOCUMENTS

WO     WO02/42383 A1     5/2002

OTHER PUBLICATIONS

Hattori et al., "Investigation on Influence of Coating Materials to Zero Stress Aging of Optical Fiber", International Wire and Cable Symposium Proceedings 1995, pp. 865-871.

Murata et al., "Reliability of the Adhesion of the Glass-Primary Coating Interface on Optical Fibers", International Wire and Cable Symposium Proceedings 1996, pp. 322-327.

Cocchini et al., "Influence of Glass-Coating Adhesion on the Optical and Mechanical Performances of Fibres in Water", International Wire and Cable Symposium Proceedings 1994, pp. 66-70.

C. Aloisio et al, "Optical Fiber Coating Delamination Using Model Coating Materials", International Wire & Cable Symposium, Proceedings of the 51st IWCS, pp. 738-747.

* cited by examiner

COATED OPTICAL FIBER AND OPTICAL FIBER COATING SYSTEM INCLUDING A HYDROPHILIC PRIMARY COATING

BACKGROUND OF THE INVENTION

1. Field of the Invention

The present invention relates generally to optical fiber, and more particularly to coating systems for optical fiber and coated optical fibers.

2. Technical Background

Optical fiber has acquired an increasingly important role in the field of telecommunications, frequently replacing existing copper wires. This trend has had a significant impact in all areas of telecommunications, greatly increasing the amount of data that is transmitted. Further increase in the use of optical fiber is foreseen, especially in metro and fiber-to-the-home applications, as local fiber networks are pushed to deliver an ever-increasing volume of audio, video, and data signals to residential and commercial customers. In addition, use of fiber in home and commercial premise networks for internal data, audio, and video communications has begun, and is expected to increase.

Optical fiber is typically made of glass, and usually has a polymeric primary coating and a polymeric secondary coating. The primary coating (also known as an inner primary coating), is typically applied directly to the glass fiber, and when cured forms a soft, elastic, compliant material encapsulating the glass fiber. The primary coating has a low Young's modulus, and serves as a buffer to cushion and protect the glass fiber during bending, cabling or spooling. The secondary coating (also known as an outer primary coating) is applied over the primary coating, and acts as a tough, protective outer layer that prevents damage to the glass fiber during processing, handling and use.

It is commonly believed that water can corrode glass and introduce defects onto a glass surface. In order to protect the glass surface of the optical fiber from water, conventional optical fiber primary coatings are designed to be hydrophobic in nature. While highly hydrophobic primary coatings do provide a low-water environment to the optical fiber, they are also quite sensitive to hydrocarbon solvents as well as to the hydrophobic fill compounds commonly used in optical fiber cables. Primary coatings of more moderate hydrophobicity are less sensitive to cable fill compounds, may exhibit water bubble formation (e.g., a "mist" of very fine bubbles) when soaked in water. There remains a need for an optical fiber coating system having a primary coating having desirable mechanical properties and that is resistant to hydrophobic solvents and cable fill compounds as well as to the formation of water bubbles when the optical fiber is soaked in water.

SUMMARY OF THE INVENTION

One embodiment of the present invention relates to a coated optical fiber including an optical fiber having a core and a cladding; a hydrophilic primary coating encapsulating the optical fiber, the primary coating having a Young's modulus less than about 2 MPa; and a secondary coating encapsulating the primary coating, wherein the primary coating exhibits substantially no water bubble formation and substantially no delamination when the coated optical fiber is soaked in water at 23° C. for 30 days.

Another embodiment of the present invention relates to a coated optical fiber including an optical fiber having a core and a cladding; a hydrophilic primary coating encapsulating the optical fiber, the primary coating having a Young's modulus less than about 2 MPa and an average water absorption of at least about 4%; and a secondary coating encapsulating the primary coating.

Another embodiment of the present invention relates to an optical fiber coating system including a hydrophilic primary coating having a Young's modulus less than about 2 MPa; and a secondary coating, wherein the primary coating exhibits substantially no water bubble formation and substantially no delamination when an optical fiber coated with the coating system is soaked in water at 23° C. for 30 days.

Another embodiment of the present invention relates to an optical fiber coating system including a hydrophilic primary coating having a Young's modulus less than about 2 MPa and an average water absorption of at least about 4%; and a secondary coating.

The coated optical fibers and optical fiber coating systems of the present invention result in a number of advantages over prior art devices and methods. The primary coatings of the optical fibers of the present invention are highly resistant to the formation of water bubbles, while retaining a high resistance to hydrophobic solvents and cable fill compounds. Optical fibers according to the present invention can be configured to have low microbending losses, good adhesion of the coating system to the fiber, and adequate strength after water soak.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DETAILED DESCRIPTION OF THE PREFERRED EMBODIMENTS

Figure 1:
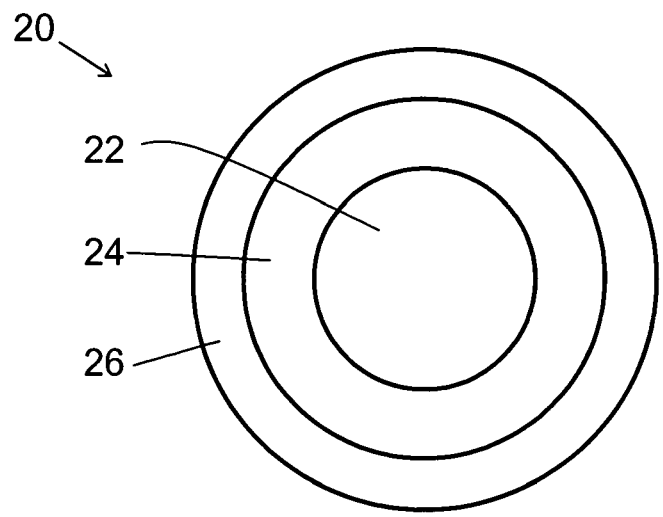
FIG. 1 is a schematic view of a coated optical fiber according one embodiment of the present invention.

One embodiment of the present invention relates to a coated optical fiber. An example of a coated optical fiber is shown in schematic cross-sectional view in FIG. 1. Coated optical fiber 20 includes an optical fiber 22, a primary coating 24 encapsulating the optical fiber, and a secondary coating 26 encapsulating the primary coating. In the coated optical fiber of FIG. 1, the primary coating is applied directly to the surface of the optical fiber, and the secondary coating is applied directly to the surface of the primary coating. As the skilled artisan will appreciate, in alternative embodiments of the invention, a thin (e.g., less than 10 μm in thickness) layer of another coating may be formed between the optical fiber and the primary coating, and/or between the primary coating and the secondary coating.

The optical fiber 22 is an uncoated optical fiber including a core and a cladding, as is familiar to the skilled artisan. The uncoated optical fiber may be a single mode fiber or a multimode fiber. The optical fiber may be adapted for use as a data transmission fiber (e.g., SMF-28®, LEAF®, and METROCOR®, each of which is available from Corning Incorporated of Corning, N.Y.). Alternatively, the optical fiber may perform an amplification, dispersion compensation, or polarization maintenance function, or may be used in short lengths in coupling optical devices. The skilled artisan will appreciate that the coatings described herein are suitable for use with virtually any optical fiber for which protection from the environment is desired.

In coated optical fiber 20, optical fiber 22 is surrounded by a primary coating 24. Primary coating 24 is a hydrophilic primary coating having a Young's modulus less than about 2 MPa. When the coated optical fiber is soaked in water at 23° C. for 30 days, the primary coating exhibits substantially no water bubble formation and substantially no delamination. Desirably, when the coated optical fiber is soaked in water at 65° C. for 60 days, the primary coating exhibits substantially no water bubble formation and substantially no delamination. For example, the primary coating desirably exhibits an average of less than about 20 water bubbles 1 μm or greater in diameter per mm of coated optical fiber after the water soak. More desirably, the primary coating exhibits an average of less than about 5 water bubbles 1 μm or greater in diameter per mm of coated optical fiber after the water soak. In certain especially desirable embodiments of the invention, the primary coating exhibits an average of less than 1 water bubble 1 μm or greater in diameter per mm of coated optical fiber. Further, the primary coating desirably does not become translucent or exhibit formation of a mist of fine water bubbles after the water soak.

The hydrophilic primary coating of the coated optical fiber desirably has an average water absorption value of at least 4 wt %. More desirably, the hydrophilic primary coating of the coated optical fiber has an average water absorption value of at least about 6 wt %. The average water absorption value is determined by forming a 0.10" (254 μm) thick layer of a primary curable composition on each of four release papers. The layers of primary curable composition are cured to give films of the primary coating material as 0.006–0.008" (152–203 μm) in thickness. A second sheet of release paper is placed over each film, and the films are cut into 5 cm×20 cm samples. The top piece of release paper is removed, and the samples are placed in a desiccator for 24 hours. Each film is weighed with the release paper, then placed on a TEFLON-coated glass fiber mesh. After removal of the release paper, the film/mesh composite sample is weighed to allow determination of the weight of the film alone. A second TEFLON-coated glass fiber mesh section is placed on the bare side of each film. The samples are soaked in deionized water at 23° C. for 24 hours, after which time they are blotted dry with a lint-free cloth and reweighed. The weight change for each sample is calculated as a percent; the average water absorption value is the average of the four calculated weight changes.

In order to provide adequate cushioning and bend protection for the optical fiber, the hydrophilic primary coating desirably has a Young's modulus of about 1.5 MPa or less. Desirably, the primary coating has a Young's modulus of about 1.25 MPa or less. In certain especially desirable embodiments of the present invention, the primary coating has a Young's modulus of about 1 MPa or less. As used herein, the Young's modulus of a primary coating is measured using a tensile testing instrument (e.g., a Sintech MTS Tensile Tester, or an Instron Universal Material Test System) on a sample of material shaped as a film between about 0.003" (76 μm) and 0.004" (102 μm) in thickness and about 1.3 cm in width, with a gauge length of 5.1 cm, and a test speed of 2.5 cm/min.

In certain embodiments of the invention, optical fiber coating systems having a hydrophilic primary coating exhibit a desirable level of adhesion to a glass optical fiber. According to one embodiment of the invention, the coated optical fiber of FIG. 1 has a dry pullout value of at least about 1 pound force. More desirably, the coated optical fiber has a dry pullout value between about 2 pounds force and about 3.5 pounds force. As used herein, pullout is the peak force needed to pull a 1 cm length of the optical fiber out of the coating system. The pullout tests are based on FOTP-105, Recommended Standard EIA/TIA-455, and are described in more detail in U.S. patent application Ser. No. 09/712,565, which is hereby incorporated herein by reference in its entirety. Pullout has been used as a measure of the adhesion of the coating system to the optical fiber. As used herein, the dry pullout value is measured on an optical fiber at 50% relative humidity at a temperature of 23° C. Wet pullout is measured on an optical fiber that has been soaked in water for 14 days at 23° C.

The skilled artisan has conventionally avoided the use of hydrophilic primary coatings in optical fiber due to concerns about fatigue and strength degradation in wet environments by action of water at the glass surface of the optical fiber. Surprisingly, the present inventors have discovered that hydrophilic primary coatings do not necessarily lead to significant degradation in fiber strength. For example, according to one embodiment of the invention, a coated optical fiber having a hydrophilic primary coating has a 50% failure stress after being soaked in water at 65° C. for 14 days that is within 10% of the 50% failure stress before being soaked. According to another embodiment of the invention, a coated optical fiber having a hydrophilic primary coating has a 50% failure stress after being exposed to 85% relative humidity at 85° C. for 30 days that is within 10% of the 50% failure stress before exposure. The failure stress test is performed as described in FOTP-28 (also known as EIA-455-28), "Measuring Dynamic Strength and Fatigue Parameters of Optical Fiber by Tension," available from Global Engineering Documents at global.ihs.com.

Primary coating 24 desirably has a glass transition temperature lower than the lowest projected use temperature of the coated optical fiber. For example, the primary coating desirably has a glass transition temperature less than about −10° C. In especially desirable embodiments of the invention, the primary coating has a glass transition temperature of about −20° C. or less. Primary coating 24 desirably has a higher refractive index than the cladding of the optical fiber in order to allow it to strip errant optical signals away from the core of optical fiber 22. In a typical optical fiber used for long-distance transmission of optical signals, the refractive index values at a wavelength of 1550 nm for the core and cladding are 1.447 and 1.436, respectively; as such, for typical silica based optical fibers, it is desirable that the refractive index of the primary coating of be greater than 1.44 at 1550 nm. The primary coating should maintain adequate adhesion to the glass fiber during thermal and hydrolytic aging, yet be strippable therefrom for splicing purposes. The primary coating typically has a thickness in the range of 25–50 μm (e.g., about 32.5 μm). Primary coatings are typically applied to the optical fiber as a liquid and cured, as will be described in more detail hereinbelow.

The polymeric material used as the primary coating in the present invention may be the cured product of a primary curable composition including an oligomer and at least one monomer. As is conventional, the primary curable composition used in forming the primary coating may also include photoinitiators, antioxidants, and other additives familiar to the skilled artisan. In desirable embodiments of the invention, the oligomer and monomer(s) of the primary curable composition are ethylenically unsaturated. In especially desirable embodiments of the invention, the oligomer and monomer(s) of the primary curable composition are (meth) acrylate-based. The oligomer may be, for example, a urethane (meth)acrylate oligomer. However, as the skilled artisan will recognize, oligomers and monomers adapted for other curing chemistries, such as epoxy, vinyl ether, and thiol-ene, may be used in accordance with the present invention.

The skilled artisan will select monomers and oligomers that provide the desired level of hydrophilicity to the primary coating. The oligomer and/or monomer components desirably include hydrophilic moieties in their structure, such as hydroxyl, polyether (especially poly(ethylene glycol)), polyester, amide, amine, carboxylic acid, sulfonate, phosphate, urethane or urea. For example, polyether-based (especially poly(ethylene glycol)-based), polyester-based and hydroxyfunctional oligomers are especially desirable for use in the primary curable compositions used to make the primary coatings of the present invention. Monomers such as poly(ethylene glycol)monoacrylate; poly(ethylene glycol) diacrylate; N-vinyl-2-pyrrolidone; N,N-dimethylacrylamide; N-hydroxy succinimide; 2-hydroxyethyl acrylate; acrylic acid; acrylated phosphates, styryl sulfonates; and sorbitol acrylate are especially useful in formulating the primary curable compositions of the present invention. Monomers and oligomers desirable for use in the primary coating of the present invention are desirably substantially free of basic contaminants.

Desirable acrylate-terminated oligomers for use in the primary curable compositions include BR3731, BR3741, and KWS4131, from Bomar Specialty Co.; polyether urethane acrylate oligomers (e.g., CN986, available from Sartomer Company); polyester urethane acrylate oligomers (e.g., CN966 and CN973, available from Sartomer Company; and BR7432, available from Bomar Specialty Co.); polyether acrylate oligomers (e.g., GENOMER 3456, available from Rahn AG); polyester acrylate oligomers (e.g., EBECRYL 80, 584 and 657, available from UCB Radcure); and epoxy acrylate oligomers (e.g., CN120, available from Sartomer Company, and EBECRYL 3201 and 3604, available from UCB Radcure). Other oligomers are described in U.S. Pat. Nos. 4,609,718; 4,629,287; and 4,798,852, each of which is incorporated herein by reference. The above described oligomers may be used singly, or in combination, as the skilled artisan would readily appreciate. The oligomer of the primary curable composition is desirably selected to provide the primary coating with the desired glass transition temperature and tensile properties. One type of desirable oligomer for use in the primary curable composition is an oligomer having a soft block having $M_n$ of about 4000 Daltons or greater. Examples of such oligomers are described in U.S. patent application Ser. No. 09/916,536, which is incorporated herein by reference in its entirety. Oligomers that are especially desirable for use in the primary coating compositions of the present invention have flexible backbones, low polydispersities, and low crosslink densities. The oligomer is desirably chosen to confer a desirable degree of hydrophilicity on the cured polymeric material of the primary coating; for example, polyether-based and polyester-based oligomers are especially desirable for use in the primary curable compositions used to make the primary coatings of the present invention.

The total oligomer content of the primary curable composition may be between about 5 wt % and about 95 wt %. Desirably, the total oligomer content of the primary curable composition is between about 25 wt % and about 75 wt %. In certain embodiments of the invention, the oligomer content of the primary curable composition is between about 40 wt % and about 60 wt %.

The monomer component of the primary curable composition is generally selected to be compatible with the oligomer, to provide a low viscosity formulation, to increase the refractive index of the primary coating, and to confer a desirable degree of hydrophilicity on the cured polymeric material of the primary coating. The skilled artisan will recognize that monomers may be used alone or in combination. In some cases, when multiple types of monomers are used, one monomer is chosen to be highly hydrophilic, while a second monomer is chosen to be more moderately hydrophilic while having other desirable properties, such as high refractive index or fast cure.

One group of suitable monomers for use in the monomer component includes ethoxylated acrylates, ethoxylated alkylphenol monoacrylates, propylene oxide acrylates, n-propylene oxide acrylates, iso-propylene oxide acrylates, mono functional acrylates, multifunctional acrylates, and combinations thereof. Especially preferred monomers include $R_2$—$R_1$—O—$(CH_2CH_3CH—O)_n$—COCH=$CH_2$, where $R_1$ and $R_2$ are aliphatic, aromatic, or a mixture of both, and n=1 to 10, and $R_1$—O—$(CH_2CH_3CH—O)_n$—COCH=$CH_2$, where $R_1$ is aliphatic or aromatic, and n=1 to 10. Specific examples include ethylenically unsaturated monomers including lauryl acrylate (e.g., SR335 available from Sartomer Company, Inc., AGEFLEX FA12 available from CPS Chemical Co. (Old Bridge, N.J.), and PHOTOMER 4812 available from Cognis (Ambler, Pa.)), ethoxylated nonylphenol acrylate (e.g., SR504 available from Sartomer Company, Inc. and PHOTOMER 4003 available from Cognis), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from CPS Chemical Co., and PHOTOMER 4035 available from Cognis), isooctyl acrylate (e.g., SR440 available from Sartomer Company, Inc. and AGEFLEX FA8 available from CPS Chemical Co.), tridecyl acrylate (e.g., SR489 available from Sartomer Company, Inc.), phenoxyglycidyl acrylate (e.g., CN131 available from Sartomer Company, Inc.), lauryloxyglycidyl acrylate (e.g., CN130 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and Ageflex FA10 available from CPS Chemical Co.), 2-(2-ethoxyethoxy)ethyl acrylate (e.g., SR256 available from Sartomer Company, Inc.), and combinations thereof.

In certain embodiments of the invention, it may be desirable to use a hydroxyfunctional monomer in the primary curable composition. A hydroxyfunctional monomer is a monomer that has a pendant hydroxy moiety in addition to an oligomer-reactive functionality (e.g., acrylate). Examples of hydroxyfunctional monomers including pendant hydroxyl groups include caprolactone acrylate (available from Dow Chemical as TONE M-100); poly(alkylene glycol)mono (meth)acrylates, such as poly(ethylene glycol)monoacrylate, poly(propylene glycol)monoacrylate, and poly(tetramethylene glycol)monoacrylate (each available from Monomer, Polymer & Dajac Labs); 2-hydroxyethyl(meth)acrylate, 3-hydroxypropyl(meth)acrylate, and 4-hydroxybutyl(meth)acrylate (each available from Aldrich). The hydroxyfunctional monomer is desirably present in an amount sufficient to improve adhesion of the primary coating to the optical fiber. For example, the hydroxyfunctional monomer may be present in an amount between about 0.1 wt % and about 25 wt % of the primary curable composition. Desirably, the hydroxyfunctional monomer is present in an amount between about 0.5 wt % and about 8 wt % of the primary curable composition. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the primary coating. Hydroxyfunctional monomers are described in more detail in U.S. patent application Ser. No. 09/712,565, which is incorporated herein by reference.

The total monomer content of the primary curable composition may be between about 5 wt % and about 95 wt %. Desirably, the total monomer content of the primary curable composition is between about 25 wt % and about 65 wt %. In certain embodiments of the invention, the monomer content of the primary curable composition is between about 35 wt % and about 55 wt %.

Through variation of the oligomers, and the polyols from which they are based, coatings having the desired properties (e.g., $T_g$, modulus, elongation) can be prepared in accordance with the present disclosure. The mechanical properties of these coatings can be adjusted by the choice of the oligomer and the monomer component. In order to provide coating formulations with a viscosity that is in a range suitable for processing, the viscous oligomers may be diluted with low viscosity, radiation curable monomers with which the oligomers are compatible.

In addition, according to the Fox equation, the ultimate glass transition temperature of a cured coating will be a function of the glass transition temperatures of the components of the coating formulation from which it is made. Thus, a desirable monomer in an optical fiber coating would be a low viscosity material with a low homopolymer glass transition temperature, which can readily dissolve the oligomer and which does not negatively impact the mechanical properties of the cured coating. In addition to low $T_g$ and suitable viscosity, the selection of the oligomer and monomer combinations may be influenced by other desirably properties for optical fibers. These additional properties include suitably high refractive index, good optical clarity, low oil sensitivity, high thermal and light resistance, low extractable content, and fast cure.

The primary curable composition may also contain a polymerization initiator which is suitable to cause polymerization (i.e., curing) of the composition after its application to an optical fiber. Polymerization initiators suitable for use in the primary curable compositions of the present invention include thermal initiators, chemical initiators, electron beam initiators, and photoinitiators. Particularly preferred are the photoinitiators. For most acrylate-based coating formulations, conventional photoinitiators, such as ketonic photoinitiating and/or phosphine oxide additives, are preferred.

When used in the compositions of the present invention, the photoinitiator is present in an amount sufficient to provide rapid ultraviolet curing.

Suitable photoinitiators include 1-hydroxycyclohexylphenyl ketone (e.g., IRGACURE 184 available from Ciba Specialty Chemical (Hawthorne, N.Y.); bis(2,6-dimethoxybenzoyl)-2,4,4-trimethylpentylphosphine oxide (e.g., commercial blends IRGACURE 1800, 1850, and 1700 available from Ciba Specialty Chemical); 2,2-dimethoxy-2-phenylacetophenone (e.g., IRGACURE 651, available from Ciba Specialty Chemical); bis(2,4,6-trimethylbenzoyl)phenylphosphine oxide (IRGACURE 819); (2,4,6-trimethylbenzoyl)diphenyl phosphine oxide (LUCERIN TPO, available from BASF (Munich, Germany)); ethoxy(2,4,6-trimethylbenzoyl)phenylphosphine oxide (LUCERIN TPO-L from BASF); and combinations thereof.

The total photoinitiator content of the primary curable composition may be up to about 10 wt %. Desirably, the total photoinitiator content of the primary curable composition is between about 0.5 wt % and about 6 wt %. The photoinitiator component of the primary curable composition may consist of a single photoinitiator; alternatively, two or more photoinitiators may be combined to lend a desired curing property to the curable composition. For example, a combination of IRGACURE 819 and IRGACURE 184 may be used to ensure adequate surface cure as well as complete cure of the bulk primary coating material.

The photoinitiator, when used in a small but effective amount to promote radiation cure, provides reasonable cure speed without causing premature gelation of the coating composition. A desirable cure speed is any speed sufficient to cause substantial curing of the coating materials. A preferred dosage for coating thicknesses of about 25–35 $\mu$m is, for example, less than about 1.0 J/cm$^2$, preferably less than about 0.5 J/cm$^2$.

As used herein, the weight percent of a particular component refers to the amount introduced into the bulk curable composition excluding an additional adhesion promoter and other additives. The amount of additional adhesion promoter and various other additives that are introduced into the curable composition to produce a composition of the present invention is listed in parts per hundred. For example, a monomer, oligomer, and photoinitiator are combined to form the curable composition such that the total weight percent of these components equals 100 percent. To this bulk curable composition, an amount of an additional adhesion promoter, for example 1.0 part per hundred, can be employed in excess of the 100 weight percent of the bulk composition.

It may be desirable to include an adhesion promoter in the primary curable composition. In one embodiment of the present invention, an adhesion promoter is present in the primary curable composition in an amount between about 0.02 to about 10 parts per hundred, more preferably between about 0.05 to about 4 parts per hundred, most preferably between about 0.1 to about 2 parts per hundred. In certain embodiments of the present invention, the adhesion promoter is present in an amount of about 0.1 to about 0.75 pph. Suitable adhesion promoters include alkoxysilanes, organotitanates, and zirconates. Preferred adhesion promoters include 3-mercaptopropyltrialkoxysilane (e.g., 3-MPTMS, available from United Chemical Technologies (Bristol, Pa.)), bis(trialkoxysilylethyl)benzene, acryloxypropyltrialkoxysilane (e.g., (3-acryloxypropyl)trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl)benzene (available from Gelest (Tullytown, Pa.)); see U.S. patent application Ser. No. 09/301,814, filed Apr. 29, 1999, which is hereby incorporated by reference in its entirety. The skilled artisan may use other conventional adhesion promoters in the primary curable compositions used in the present invention.

While adhesion promoters may be used in the present invention, their use is not required. According to one embodiment of the invention, the primary curable composition includes essentially no organosilane adhesion promoter, yet the optical fiber coated therewith has a pullout value greater than 1 pound force. For example, in some embodiments of the invention, the primary curable composition includes less than 0.1 wt % organosilane adhesion promoter. The inventors surmise that this behavior arises because the hydrophilic primary coating is sufficiently polar to adhere well to the glass surface in the absence of additional adhesion promoters.

In addition to the above-described components, the primary curable composition of the present invention can optionally include any number of additives, such as reactive diluents, antioxidants, catalysts, and other stabilizers and property-enhancing additives. Some additives can operate to control the polymerization process, thereby affecting the physical properties (e.g., modulus, glass transition temperature) of the polymerization product formed from the primary curable composition. Others can affect the integrity of the polymerization product of the primary curable composition (e.g., protect against de-polymerization or oxidative degradation). For example, the primary curable composition may include a carrier, as described in U.S. Pat. Nos. 6,326,416 and 6,539,152, each of which is hereby incorporated herein by reference.

The primary coating composition may also include a strength additive, as described in U.S. patent application Ser. No. 10/077,166, which is hereby incorporated herein by reference in its entirety. Desirable strength additives include mercapto-functional compounds, such as N-(tert-butoxycarbonyl)-L-cysteine methyl ester; pentaerythritol tetrakis(3-mercaptopropionate); (3-mercaptopropyl)trimethoxysilane; (3-mercaptopropyl)trimethoxysilane; and dodecyl mercaptan. The strength additive is desirably present in the primary curable composition in an amount less than about 1 pph. More desirably, the strength additive is present in the primary curable composition in an amount less than about 0.5 pph. In certain embodiments of the invention, the strength additive is present in the primary curable composition in an amount between about 0.01 pph and about 0.1 pph.

A preferred antioxidant is thiodiethylene bis(3,5-di-tert-butyl)-4-hydroxyhydrocinnamate) (e.g., IRGANOX 1035, available from Ciba Specialty Chemical).

The composition can further include additional additives such as waxes, lubricants, slip agents, as well as other additives known in the art.

In coated optical fiber 20 of FIG. 1, primary coating 24 is surrounded by secondary coating 26. While in FIG. 1, the secondary coating is shown as being applied directly to the primary coating, the skilled artisan will recognize that in alternative embodiments of the invention there may be one or more intermediate coating layers deposited between the primary coating and the secondary coating. Secondary coating 26 is formed from a cured polymeric material, and typically has a thickness in the range of 20–35 µm (e.g., about 27.5 µm). The secondary coating desirably has sufficient stiffness to protect the optical fiber; is flexible enough to be handled, bent, or spooled; has low tackiness to enable handling and prevent adjacent convolutions on a spool from sticking to one another; is resistant to water and chemicals such as optical fiber cable filling compound; and has adequate adhesion to the coating to which it is applied (e.g., the primary coating).

Figure 2:
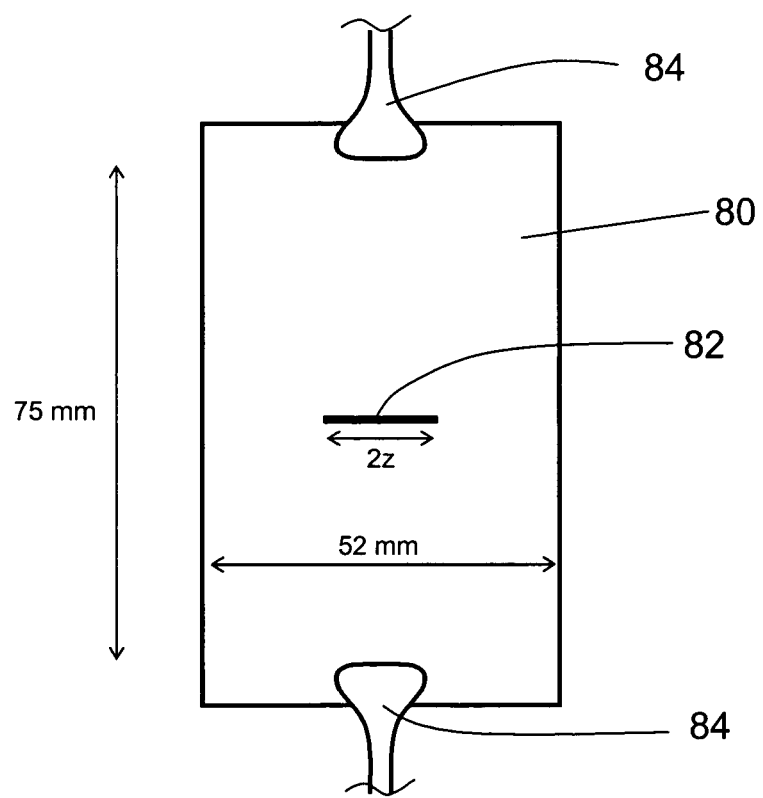
FIG. 2 is a schematic view of a film sample used to measure fracture toughness.

The resistance of a material to unstable, catastrophic crack growth is described by the material property known as fracture toughness, $K_{1C}$. The fracture toughness of a material relates to the amount of energy required to propagate a crack in the material. As used herein, fracture toughness $K_{1C}$ is measured on film samples, and is defined as $Y\sigma\sqrt{z}$, where Y is a geometry factor, $\sigma$ is the tensile strength (at break) of the film sample, and z is half of the notch length. Fracture toughness is measured on films having a center cut notch geometry. FIG. 2 is a schematic depiction of the sample geometry used in measuring fracture toughness. Film sample 80 has a width of about 52 mm, and is about 0.010" (254 µm) in thickness. A notch 82 having a length of 2z is cut in the center of the film using a sharp blade using methods familiar to the skilled artisan. Notches having lengths of 18 mm, 24 mm, and 30 mm are cut in different samples. The tensile strength (at break) of the sample, $\sigma$, is measured using a tensile testing instrument (e.g., a Sintech MTS Tensile Tester, or an Instron Universal Material Test System), as described above. The sample is gripped in the jaws 84 of the tensile testing instrument such that the gauge length is 7.5 cm. The displacement rate is 2.0 mm/min. The tensile strength may be calculated by dividing the applied load at break by the cross-sectional area of the intact sample. For the samples described above, the tensile strength may be calculated using the equation $$\sigma = \frac{\text{Load}}{254\ \mu\text{m}(52\ \text{mm} - 2z)}.$$

Y is a geometry factor, and is defined as $1.77 - 0.177(2\lambda) + 1.77(2\lambda)^2$, where $\lambda = z/\text{sample width}$.

The sensitivity of the secondary coating to handling and to the formation of defects is reflected by its ductility. Ductility is defined by the equation $$\text{Ductility} = \left(\frac{K_{1C}}{\text{yield stress}}\right)^2.$$

Larger ductilities indicate reduced sensitivity of the secondary coating to defects. As used herein, the Young's modulus, elongation to break, and tensile strength of a secondary coating material is measured using a tensile testing instrument (e.g., a Sintech MTS Tensile Tester, or an Instron Universal Material Test System) on a sample of a material shaped as a cylindrical rod about 0.0225" (571.5 µm) in diameter, with a gauge length of 5.1 cm, and a test speed of 2.5 cm/min. Yield stress can be measured on the rod samples at the same time as the Young's modulus, elongation to break, and tensile strength, as described above. As is familiar to the skilled artisan, for samples that exhibit strain softening, the yield stress is determined by the first local maximum in the stress vs. strain curve. More generally, the yield stress can be determined using the method given in ASTM D638-02, which is incorporated herein by reference. Physical properties such as Young's modulus, elongation to break, tensile strength, and yield stress are determined as an average of ten samples, with outlying data points or obviously defective samples being excluded from the average.

The secondary coating 26 of coated optical fiber 20 is formed from a cured polymeric material having a ductility of at least about 275 μm. In desirable embodiments of the present invention, the cured polymeric material of the secondary coating has a ductility of at least about 300 μm. In especially desirable embodiments of the present invention, the cured polymeric material of the secondary coating has a ductility of at least about 370 μm. In certain embodiments of the present invention, the cured polymeric material of the secondary coating has a ductility of at least about 450 μm. The cured polymeric material of secondary coating 26 of optical fiber 20 desirably has a fracture toughness of at least about 0.7 MPa·m$^{1/2}$. In certain embodiments of the invention, the cured polymeric material of the secondary coating has a fracture toughness of at least about 0.9 MPa·m$^{1/2}$. The cured polymeric material of the secondary coating 26 of coated optical fiber 20 desirably has a Young's modulus of greater than about 900 MPa. In desirable embodiments of the invention, the cured polymeric material of the secondary coating has a Young's modulus of at least about 1200 MPa. In especially desirable embodiments of the invention, the cured polymeric material of secondary coating 26 has a Young's modulus of at least about 1400 MPa. In the present invention, secondary coatings having high toughness and ductility are especially desirable, so that they are resistant to fracture that might be caused by swelling of the hydrophilic primary coating with water absorption.

The cured polymeric materials used in the secondary coatings of the optical fibers of the present invention may be the cured product of a secondary curable composition including an oligomer and at least one monomer. As is conventional, the secondary curable compositions used in forming the secondary coatings may also include photoinitiators, antioxidants, and other additives familiar to the skilled artisan. In desirable embodiments of the invention, the oligomer and monomers of the secondary curable composition are ethylenically unsaturated. In especially desirable embodiments of the invention, the oligomer and monomers of the secondary curable composition are (meth)acrylate-based. The oligomer may be, for example, a urethane (meth)acrylate oligomer. However, as the skilled artisan will recognize, oligomers and monomers adapted for other curing chemistries, such as epoxy, vinyl ether, and thiol-ene, may be used in accordance with the present invention.

Desirably, the oligomer of the curable composition is selected to provide a high ductility and a high Young's modulus to the cured polymeric material. The skilled artisan may use conventional or commercially available oligomers in the secondary curable compositions of the present invention. For example, the oligomer may be the capped product of the reaction of a dihydric polyether, polyester, or polycarbonate with an aliphatic or aromatic diisocyanate. When it is desirable to provide increased moisture resistance, the skilled artisan may use oligomers based on nonpolar diols, such as saturated aliphatic diols. Examples of commercially available oligomers suitable for use in the curable compositions of the present invention include BR301 and KWS4131 from Bomar Specialty Co.; RCC12-892 and RCC13-572 from Cognis Corp; PHOTOMER 6008 and 6010 from Cognis Corp; and EBECRYL 8800, 4883, 8804, 8807, 8402, and 284 from UCB Radcure. Further, in certain desirable embodiments of the invention, oligomers that have rigid polyol-derived subunits, multiple functionality, and/or crystallizable moieties are especially desirable for use in the secondary curable compositions of the present invention. Such oligomers, as well as secondary coatings prepared therefrom, are described in U.S. patent application Ser. No. 10/454,984, entitled "COATED OPTICAL FIBER, METHOD FOR MAKING COATED OPTICAL FIBER, AND CURABLE COMPOSITIONS FOR COATING OPTICAL FIBER," which is hereby incorporated herein by reference in its entirety.

The secondary curable compositions of the present invention also include one or more monomers having reactive termini selected to react with the reactive termini of the oligomer. In general, individual monomers capable of greater than about 80% conversion are more desirable than those having lower conversion rates. The degree to which monomers having low conversion rates can be introduced into the curable composition depends upon the particular requirements of the desired cured polymeric material. Typically, higher conversion rates will yield stronger cured products.

Suitable polyfunctional ethylenically unsaturated monomers for use in the curable compositions of the present invention include, without limitation, alkoxylated bisphenol A diacrylates such as ethoxylated bisphenol A diacrylate with ethoxylation being 2 or greater, preferably ranging from 2 to about 30, and propoxylated bisphenol A diacrylate with propoxylation being 2 or greater, preferably ranging from 2 to about 30 (e.g., PHOTOMER 4025 and PHOTOMER 4028, available from Cognis Corp. (Ambler, Pa.)); methylolpropane polyacrylates with and without alkoxylation such as ethoxylated trimethylolpropane triacrylate with ethoxylation being 3 or greater, preferably ranging from 3 to about 30 (e.g., PHOTOMER 4149, Cognis Corp., and SR499, Sartomer Company, Inc.), propoxylated trimethylolpropane triacrylate with propoxylation being 3 or greater, preferably ranging from 3 to 30 (e.g., PHOTOMER 4072, Cognis Corp.), and ditrimethylolpropane tetraacrylate (e.g., PHOTOMER 4355, Cognis Corp.); alkoxylated glyceryl triacrylates such as propoxylated glyceryl triacrylate with propoxylation being 3 or greater (e.g., PHOTOMER 4096, Cognis Corp.); erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), and dipentaerythritol pentaacrylate (e.g., PHOTOMER 4399, Cognis Corp., and SR399, Sartomer Company, Inc.); isocyanurate polyacrylates formed by reacting an appropriate cyanuric acid with an acrylic acid or acryloyl chloride, such as tris(2-hydroxyethyl)isocyanurate triacrylate (e.g., SR368, Sartomer Company, Inc.) and tris(2-hydroxyethyl)isocyanurate diacrylate; alcohol polyacrylates with and without alkoxylation such as cyclohexane dimethanol diacrylate (e.g., CD406, Sartomer Company, Inc.); ethoxylated polyethylene glycol diacrylate with ethoxylation being 2 or greater, preferably ranging from about 2 to 30; epoxy acrylates such as those formed by adding acrylate to bisphenol A diglycidylether (e.g., PHOTOMER 3016, Cognis Corp.); and single and multi-ring cyclic aromatic or non-aromatic polyacrylates such as tricyclodecane dimethanol diacrylate, dicyclopentadiene diacrylate and dicyclopentane diacrylate. Bisphenol A-based monomers are especially desirable for use in the curable compositions of the present invention.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl acrylate, 2-hydroxypropyl acrylate, and 2-hydroxybutyl acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxylethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR506, Sartomer Company, Inc.), tetrahydrofurfuryl acrylate (e.g., SR285, Sartomer Company, Inc.) and acryloylmorpholine; other acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and caprolactone acrylate (e.g., SR495, Sartomer Company, Inc.); various alkoxylated alkylphenol acrylates such as ethoxylated(4) nonylphenol acrylate (e.g., PHOTOMER 4003, Cognis Corp.); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam; and acid esters such as maleates, fumarates, crotonates and vinyl esters.

Most suitable monomers are either commercially available or readily synthesized using methods familiar to the skilled artisan. For example, most of the above-listed monofunctional monomers can be synthesized by reacting an appropriate alcohol or amine with an acrylic acid or acryloyl chloride. While acrylate monomers are listed above, the skilled artisan will appreciate that the corresponding methacrylate monomers may be likewise suitable for use.

According to one embodiment of the present invention, the total oligomer content of the curable composition is less than about 25%. In especially desirable embodiments of the invention, the total oligomer content of the secondary curable composition is less than about 15%. In desirable embodiments of the present invention, the total monomer content of the secondary curable composition is greater than about 65%. In especially desirable embodiments of the invention, the monomer content of the secondary curable composition is greater than about 75%. Use of relatively low amounts of oligomer allows the skilled artisan to easily formulate curable compositions having a desirable viscosity. As the oligomer is typically a more expensive component of the composition, minimization of the amount of oligomer allows the skilled artisan to reduce the cost of the curable composition, as well as the cost of articles, such as optical fibers, coated therewith. Secondary curable compositions having low oligomer content are described in more detail in U.S. patent application Ser. No. 09/722,895, which is incorporated herein by reference in its entirety.

The secondary curable compositions of the present invention may also include a polymerization initiator. The initiator is desirably present in an amount effective to initiate polymerization of the curable composition. Desirable secondary curable compositions of the present invention are adapted to be cured by actinic radiation, and include one or more photoinitiators. For most (meth)acrylate-based curable compositions, conventional photoinitiators, such as ketonic and/or phosphine-oxide based initiators, may be used. Generally, the total photoinitiator content of the curable composition is between about 0.1 and about 10.0 weight percent. More desirably, the total photoinitiator content of the curable composition is between about 1.0 and about 7.5 weight percent. Suitable photoinitiators include, without limitation, 1-hydroxycyclohexylphenyl ketone (e.g., IRGACURE 184 available from Ciba Specialty Chemical (Tarrytown, N.Y.)), bis(2,6-dimethoxybenzoyl)-2,4,4-trimethylpentyl phosphine oxide (e.g., in commercial blends IRGACURE 1800, 1850, and 1700, Ciba Specialty Chemical), (2,4,6-trimethylbenzoyl)diphenyl phosphine oxide (e.g., LUCIRIN TPO, available from BASF), 2,2-dimethoxyl-2-phenyl acetophenone (e.g., IRGACURE 651, Ciba Specialty Chemical), bis(2,4,6-trimethylbenzoyl)phenyl phosphine oxide (e.g., IRGACURE 819, Ciba Specialty Chemical), 2-hydroxy-2-methyl-1-phenylpropane-1-one (e.g., in commercial blend DAROCUR 4265, Ciba Specialty Chemical) and combinations thereof. It may be desirable to use a combination of an α-hydroxy ketone photoinitiator (e.g., IRGACURE 184) with a bis(acyl)phosphine oxide or mono(acyl)phosphine oxide photoinitator (e.g., IRGACURE 819) to provide both adequate surface cure and adequate cure of the bulk material. Secondary curable compositions for use as secondary coatings in optical fibers may be formulated with a photoinitator having an absorption spectrum that does not completely overlap the absorption spectrum of the photoinitiator used in the primary curable composition, as is described in U.S. patent application Ser. No. 10/086,109, which is incorporated herein by reference in its entirety. For example, the primary curable composition may include IRGACURE 819, and the secondary curable composition may include IRGACURE 184 and LUCIRIN TPO. Other photoinitiators are continually being developed and used in coating compositions on glass fibers. Any suitable photoinitiator can be introduced into compositions of the present invention.

In addition to the above-described components, the curable compositions of the present invention can optionally include an additive or a combination of additives. Suitable additives include, without limitation, antioxidants, catalysts, lubricants, low molecular weight non-crosslinking resins, adhesion promoters, coupling agents, coloring agents, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation). A desirable antioxidant is thiodiethylene bis(3,5-di-tert-butyl)-4-hydroxyhydrocinnamate, available as IRGANOX 1035 from Ciba Specialty Chemical). A suitable adhesion promoter is an acrylated acid adhesion promoter such as EBECRYL 170, available from UCB Radcure. Titanium and zirconium-based coupling agents and optical brighteners such as those described in U.S. patent application Ser. Nos. 09/726,002 and 09/747,480, each of which is incorporated herein by reference in its entirety, may also be used in the curable compositions of the present invention. Optical brighteners such as UVITEX OB, available from Ciba may also be used in the curable compositions of the present invention.

Other suitable materials for use in secondary coating materials, as well as considerations related to selection of these materials, are well known in the art and are described in U.S. Pat. Nos. 4,962,992 and 5,104,433 to Chapin, which are hereby incorporated herein by reference. Various additives that enhance one or more properties of the coating can also be present, including the above-mentioned additives incorporated in the compositions of the present invention.

Another embodiment of the present invention relates to a method of making an optical fiber including the primary and secondary coatings described hereinabove. This method can generally be performed by standard methods with the use of a coating system of the present invention. Briefly, the process involves fabricating the glass fiber (using methods familiar to the skilled artisan), applying the primary curable composition to the glass fiber, polymerizing the primary curable composition to form the primary coating material, applying the secondary curable composition to the coated glass fiber, and polymerizing the secondary curable composition to form the cured polymeric material as the secondary coating of the optical fiber. Optionally, the secondary curable composition can be applied to the coated fiber before polymerizing the primary curable composition, in which case only a single polymerization step is employed.

The primary and secondary curable compositions are coated on an optical fiber using conventional processes, for example, on a draw tower. It is well known to draw glass optical fibers from a specially prepared, cylindrical preform which has been locally and symmetrically heated to a temperature, e.g., of about 2000° C. As the preform is heated, such as by feeding the preform into and through a furnace, a glass optical fiber is drawn from the molten material. One or more coating compositions are applied to the glass fiber after it has been drawn from the preform, preferably immediately after cooling. The coating compositions are then cured to produce the coated optical fiber. The method of curing can be thermal, chemical, or radiation induced, such as by exposing the applied (and uncured) coating composition on the glass fiber to ultraviolet light, actinic radiation, microwave radiation, or electron beam, depending upon the nature of the coating composition(s) and polymerization initiator being employed. It is frequently advantageous to apply both a primary curable composition and any secondary curable compositions in sequence following the draw process. One method of applying dual layers of coating compositions to a moving glass fiber is disclosed in U.S. Pat. No. 4,474,830 to Taylor, which is hereby incorporated by reference. Another method for applying dual layers of coating compositions onto a glass fiber is disclosed in U.S. Pat. No. 4,581,165 to Rannell et al., which is hereby incorporated by reference. Of course, the primary curable composition can be applied and cured to form the primary coating material, then the secondary curable composition can be applied and cured to form the cured polymeric material of the secondary coating.

The coated optical fibers of the present invention are suitable for use in optical fiber ribbons and cables. As such, another embodiment of the present invention relates to an optical fiber ribbon including at least one coated optical fiber as described hereinabove. Another embodiment of the present invention relates to an optical fiber cable including at least one coated optical fiber as described hereinabove. Another embodiment of the present invention relates to optical fiber coating systems suitable for use in coating optical fibers. For example, an optical fiber coating system of the present invention includes a hydrophilic primary coating having a Young's modulus less than about 2 MPa; and a secondary coating, wherein the primary coating exhibits substantially no water bubble formation and substantially no delamination when an optical fiber coated with the coating system is soaked in water at 23° C. for 30 days. Another optical fiber coating system of the present invention includes a hydrophilic primary coating having a Young's modulus less than about 2 MPa; and an average water absorption of at least about 4%; and a secondary coating.

EXAMPLES

The present invention is further described by the following non-limiting examples.

Example 1

Primary curable compositions 1–4 and comparative primary curable compositions C1–C3 were formulated using a high-speed mixer in an appropriate container heated to 70° C. with a heating band or heating mantle. In each case, the components were weighed into the container using a balance and allowed to mix until the solid components were thoroughly dissolved and the mixture appeared homogeneous. Curable compositions are formulated such that the amounts of oligomer, monomer, and photoinitiator total 100 wt %; other additives such as antioxidant are added to the total mixture in units of pph. BR3741 is an oligomer from Bomar Specialties. PHOTOMER 4003 is a monomer available from Cognis. TONE M-100 is a monomer available from Dow Chemical. Poly(ethylene glycol)monoacrylate had a molecular weight of ~375 Daltons and was obtained from Aldrich. N,N-Dimethylacrylamide was obtained from Monomer, Polymer & Dajac Labs. V-PYROL/RC is a N-vinyl-2-pyrrolidone monomer available from ISP Technologies. IRGACURE 819, IRGACURE 184 and IRGACURE 1850 are photoinitiators available from Ciba Specialty Chemical. (3-Acryloxypropyl)trimethoxysilane is an adhesion promoter available from Gelest Incorporated. IRGANOX 1035 is an antioxidant available from Ciba. Pentaerythritol tetrakis(3-mercaptopropionate) is a strength additive available from Aldrich. TEGORAD 2000 is a carrier available from Tego Chemie. The oligomer and monomer(s) were blended together for at least one hour at 70° C. Photoinitiator(s), antioxidant and carrier were then added, and blending was continued for one hour. The strength additive was then added, and blending was continued for 30 minutes. Finally, the adhesion promoter was added, and blending was continued for 30 minutes. The components used to formulate primary curable compositions 1–4 and comparative primary curable compositions C1–C3 are detailed below in Table 2.

TABLE 2

| | Primary Curable Composition | | | | | | |
|---|---|---|---|---|---|---|---|
| Component | 1 | 2 | 3 | 4 | C1 | C2 | C3 |
| BR 3741 (wt %) | 52 | 52 | 0 | 0 | 52 | 0 | 0 |
| BR 3731 (wt %) | 0 | 0 | 52 | 52 | 0 | 52 | 52 |
| PHOTOMER 4003 (wt %) | 25 | 25 | 25 | 25 | 25 | 25 | 20 |
| Poly(ethylene glycol) monoacrylate (wt %) | 20 | 20 | 0 | 0 | 0 | 0 | 0 |
| N,N-Dimethylacrylamide (wt %) | 0 | 0 | 20 | 0 | 0 | 0 | 0 |
| V-PYROL/RC (wt %) | 0 | 0 | 0 | 20 | 0 | 0 | 0 |
| TONE M-100 (wt %) | 0 | 0 | 0 | 0 | 20 | 20 | 25 |
| IRGACURE 819 (wt %) | 1.5 | 1.5 | 0 | 0 | 1.5 | 0 | 0 |
| IRGACURE 184 (wt %) | 1.5 | 1.5 | 0 | 0 | 1.5 | 0 | 0 |

TABLE 2-continued

| | Primary Curable Composition | | | | | | |
|---|---|---|---|---|---|---|---|
| Component | 1 | 2 | 3 | 4 | C1 | C2 | C3 |
| IRGACURE 1850 (wt %) | 0 | 0 | 3.0 | 3.0 | 0 | 3.0 | 3.0 |
| (3-acryloxypropyl)-trimethoxysilane (pph) | 0 | 1 | 1 | 0 | 1 | 0 | 0 |
| Bis(trimethoxy-silylethyl)-benzene (wt %) | 0 | 0 | 0 | 1 | 0 | 0 | 1 |
| IRGANOX 1035 (pph) | 1 | 1 | 1 | 1 | 1 | 1 | 1 |
| TEGORAD 2200 (wt %) | 0 | 0 | 0 | 0.5 | 0 | 0 | 0.5 |
| pentaerythritol tetrakis(3-mercaptoproprionate) (pph) | 0.03 | 0.03 | 0 | 0 | 0.03 | 0 | 0 |

Primary curable compositions 1–4 and comparative primary curable compositions C1–C3 were cured into films for testing of mechanical properties. Wet films were cast on silicone release paper with the aid of a draw-down box having an about 0.005″ gap thickness. Films were cured using a Fusion Systems UV curing apparatus with a 600 W/in D-bulb (50% power, 10 ft/min belt speed, nitrogen purge) to yield primary coatings 1–4 and comparative primary coatings C1–C3 in film form. Cured film thickness was between about 0.003″ and 0.004″.

The films were allowed to age (23° C., 50% relative humidity) for at least 16 hours prior to testing. Film samples were cut to a specified length and width (about 15 cm×about 1.3 cm). Young's modulus, tensile strength at break, and elongation at break were measured using a Sintech tensile tester. Films were tested at an elongation rate of 2.5 cm/min starting from an initial jaw separation of 5.1 cm. Glass transition temperatures of the cured films were determined by determining the peak of the tan δ curves measured on a Seiko-5600 DMS in tension at a frequency of 1 Hz. Thermal and mechanical properties (tested in accordance with ASTM 82-997) of the cured films are reported in Table 3, below.

TABLE 3

| Primary Coating | Young's modulus (MPa) | Tensile Strength (MPa) | elongation at break (%) | $T_g$ (° C.) |
|---|---|---|---|---|
| 1 | 0.81 | 0.63 | 146 | −39 |
| 2 | 0.79 | 0.63 | 137 | ND |
| 3 | 1.44 | 1.23 | 192 | −1.2 |
| 4 | 1.95 | 1.58 | 141 | −15.8 |
| C1 | 0.78 | 0.64 | 153 | ND |
| C2 | ND | ND | ND | ND |
| C3 | 1.63 | 1.46 | 118 | −37.1 |

ND = not determined

The average water absorption values of primary coating 1 and comparative primary coating C1 were measured as described hereinabove. Primary coating 1 had an average water absorption value of 8.13%. Comparative primary coating C1 had an average water absorption value of 0.85%.

Example 2

Secondary curable compositions 5–7 were formulated in a jacketed beaker heated to 70° C. using a high-speed mixer. In each case, the components were weighed into the jacketed beaker using a balance and allowed to mix until the solid components were thoroughly dissolved and the mixture appeared homogeneous. Curable compositions are formulated such that the amounts of oligomer, monomer, and photoinitiator total 100 wt %; other additives such as antioxidant are added to the total mixture in units of pph. KWS 4131 is an oligomer from Bomar Specialties. PHOTOMER 4028 and PHOTOMER 3016 are monomers available from Cognis. The components used to formulate secondary curable compositions 5–7 are detailed in Table 4.

TABLE 4

| | Secondary Curable Composition | | |
|---|---|---|---|
| Component | 5 | 6 | 7 |
| KWS 4131 (wt %) | 10 | 0 | 10 |
| BR 301 (wt %) | 0 | 10 | 0 |
| PHOTOMER 4028 (wt %) | 82 | 65 | 82 |
| PHOTOMER 4025 (wt %) | 0 | 22 | 0 |
| PHOTOMER 3016 (wt %) | 5 | 0 | 5 |
| IRGACURE 819 (wt %) | 1.5 | 0 | 0 |
| IRGACURE 184 (wt %) | 1.5 | 0 | 0 |
| IRGACURE 1850 (wt %) | 0 | 3 | 3 |
| IRGANOX 1035 (pph) | 0.5 | 0.5 | 0.5 |

Secondary curable composition 5 was used to made rod samples for tensile testing. Rods were prepared by injecting the curable compositions into TEFLON tubing having an inner diameter of about 0.025″. The samples were cured using a Fusion D bulb at a dose of about 2.6 J/cm² (measured over a wavelength range of 225–424 nm by a Light Bug model IL390 from International Light). After curing, the TEFLON tubing was stripped away, leaving rod samples about 0.0225″ in diameter (after shrinkage due to cure). The cured rods were allowed to condition overnight in a laboratory having a controlled temperature of 23° C. and a controlled relative humidity of 50%. Films were glass plates for use in $K_{1C}$ testing. Young's modulus, tensile strength, elongation to break, $K_{1C}$ and ductility of secondary coating 5 were measured as described above, and are reported in Table 5. Secondary coating 7 had properties similar to secondary coating 5.

TABLE 5

| Secondary Coating | Tensile strength (MPa) | % Elongation | Young's Modulus (MPa) | $K_{1c}$ (MPa·m$^{1/2}$) | Ductility (μm) |
|---|---|---|---|---|---|
| 5 | 44.02 | 29.4 | 1564 | 0.75 | 325 |

Example 3

Coated optical fibers A–C and comparative optical fibers X–Z were prepared by coating optical fibers (SMF-28® fiber) with the coatings described above, as detailed below in Table 6.

TABLE 6

| Coated Optical Fiber | Primary Coating | Secondary Coating |
|---|---|---|
| A | 1 | 5 |
| B | 2 | 5 |
| C | 3 | 5 |
| X | C1 | 5 |
| Y | C2 | 6 |
| Z | C3 | 7 |

The coated optical fibers were soaked in deionized water for various times at various temperatures, and microscopy was used to observe water bubble formation and delamination. A Nikon Optiphot-2 microscope was used at 100× magnification, which could resolve water bubbles down to about few microns in size. Bubbles smaller than 1 μm appeared as a translucent, milky mist in the primary coating. Results of the water soak microscopy tests are shown in Table 7.

TABLE 7

| Fiber | 14 Day, 23° C. | 30 Day, 23° C. | 30 Day, 65° C. | 60 Day, 23° C. | 60 Day, 65° C. |
|---|---|---|---|---|---|
| A | No MD, No WB | No MD, No WB | No MD, No WB | No MD, No WB | No MD, No WB |
| B | No MD, No WB | No MD, No WB | No MD, No WB | No MD, No WB | No MD, No WB |
| C | No MD, No WB | No MD, No WB | No MD, No WB | No MD, No WB | 35% Delam |
| X | No MD, Numerous WB | No MD, Numerous WB | No MD, Numerous WB | No MD, Numerous WB | No MD, Numerous WB |
| Y | No MD, Milky | No MD, Numerous WB | 14 MD (1 mm), No WB | No MD, Numerous WB | 432 MD (0.774 mm), No WB |
| Z | No MD, Milky | No MD, Milky | No MD, Milky | No MD, Milky | No MD, Milky |

MD = micro-delamination (size in mm of largest MD observed);
WB = water bubbles;
ND = Not determined.

Example 4

The pullout values of coated optical fibers A–C and X–Z were determined as described hereinabove. Results are shown in Table 8.

TABLE 8

| Fiber ID | Dry PO (95% CI) | Wet PO (95% CI) |
|---|---|---|
| A | 2.331 lbf(0.243) | 0.748 lbf(0.106) |
| B | 2.506 lbf(0.116) | 2.018 lbf(0.176) |
| X | 3.115 lbf(0.175) | 1.161 lbf(0.055) |
| C | 2.258 lbf(0.180) | 0.537 lbf(0.069) |
| Y | 2.130 lbf(0.053) | 0.552 lbf(0.008) |
| Z | 2.897 lbf(0.189) | 0.907 lbf(0.057) |

Example 5

The 15% and 50% failure stresses (i.e., the stress needed to cause 15% or 50% of a population of fiber samples to break) of coated optical fibers A–C and X–Z were determined as described in FOTP-28. The strain rate was 4.29%/min. Results are shown in Table 9.

TABLE 9

| Fiber ID | As received, 15% failure stress (kpsi) | As received, 50% failure stress (kpsi) | 14 days, 65° C. water soak, 15% failure stress (kpsi) | 14 days, 65° C. water soak, 50% failure stress (kpsi) | 30 days, 85° C., 85% rel. humidity, 15% failure stress (kpsi) | 30 days, 85° C., 85% rel. humidity, 50% failure stress (kpsi) |
|---|---|---|---|---|---|---|
| A | 749 | 756 | 757 | 764 | *N/A | *N/A |
| B | 768 | 776 | 759 | 768 | 745 | 754 |
| X | 752 | 762 | 753 | 760 | 747 | 757 |

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A coated optical fiber comprising:
    an optical fiber having a core and a cladding;
    a hydrophilic primary coating encapsulating the optical fiber, the primary coating having a Young's modulus less than about 2 MPa; and
    a secondary coating encapsulating the primary coating, wherein the primary coating exhibits substantially no water bubble formation and substantially no delamination when the coated optical fiber is soaked in water at 23° C. for 30 days.

2. The coated optical fiber of claim 1, wherein the primary coating exhibits substantially no water bubble formation when the coated optical fiber is soaked in water at 65° C. for 60 days.

3. The coated optical fiber of claim 1, wherein the primary coating exhibits an average of less than about 20 water bubbles 1 μm or greater in diameter per mm of coated optical fiber when the coated optical fiber is soaked in water at 65° C. for 60 days.

4. The coated optical fiber of claim 1, wherein the primary coating has an average water absorption of at least about 4%.

5. The coated optical fiber of claim 1, wherein the coated optical fiber has a dry pullout value of at least about 1 pound force.

6. The coated optical fiber of claim 1, wherein the coated optical fiber has a 50% failure stress after being soaked in water at 65° C. for 14 days that is within 10% of the 50% failure stress before being soaked.

7. The coated optical fiber of claim 1, wherein the coated optical fiber has a 50% failure stress after being exposed to 85% relative humidity at 85° C. for 30 days that is within 10% of the 50% failure stress before the exposure.

8. The coated optical fiber of claim 1, wherein the primary coating is the cured reaction product of a primary curable composition comprising a polyether or polyester urethane (meth)acrylate oligomer.

9. The coated optical fiber of claim 1, wherein the primary coating is the cured reaction product of a primary curable composition comprising a monomer having a pendant hydroxy group.

10. The coated optical fiber of claim 1, wherein the primary coating is the cured reaction product of a primary curable composition comprising a monomer or oligomer having a poly(ethylene glycol) backbone.

11. The coated optical fiber of claim 1, wherein the primary coating is the cured reaction product of a primary curable composition that is substantially devoid of organosilane adhesion promoters, and wherein the coated optical fiber has a dry pullout value greater than 1 pound force.

12. The coated optical fiber of claim 1, wherein the secondary coating has a ductility of at least about 280 μm.

13. An optical fiber ribbon comprising at least one optical fiber according to claim 1.

14. An optical fiber cable comprising at least one optical fiber according to claim 1.

15. A coated optical fiber comprising:
   an optical fiber having a core and a cladding;
   a hydrophilic primary coating encapsulating the optical fiber, the primary coating having a Young's modulus less than about 2 MPa and an average water absorption of at least about 4%; and
   a secondary coating encapsulating the primary coating.

16. The coated optical fiber of claim 15, wherein the coated optical fiber has a 50% failure stress after being soaked in water at 65° C. for 14 days that is within 10% of the 50% failure stress before being soaked.

17. The coated optical fiber of claim 15, wherein the primary coating is the cured reaction product of a primary curable composition comprising a polyether or polyester urethane (meth)acrylate oligomer.

18. The coated optical fiber of claim 15, wherein the primary coating is the cured reaction product of a primary curable composition comprising a monomer having a pendant hydroxy group.

19. The coated optical fiber of claim 15, wherein the primary coating is the cured reaction product of a primary curable composition comprising a monomer or oligomer having a poly(ethylene glycol) backbone.

20. The coated optical fiber of claim 15, wherein the primary coating is the cured reaction product of a primary curable composition that is substantially devoid of organosilane adhesion promoters, and wherein the coated optical fiber has a dry pullout value greater than 1 pound force.

21. The coated optical fiber of claim 15, wherein the secondary coating has a ductility of at least about 280 μm.

22. An optical fiber coating system comprising:
   a hydrophilic primary coating having a Young's modulus less than about 2 MPa; and
   a secondary coating,
wherein the primary coating exhibits substantially no water bubble formation and substantially no delamination when an optical fiber coated with the coating system is soaked in water at 23° C. for 30 days.

23. An optical fiber coating system comprising:
   a hydrophilic primary coating having a Young's modulus less than about 2 MPa, and an average water absorption of at least about 4%; and
   a secondary coating.

* * * * *